(12) United States Patent
Gruhl et al.

(10) Patent No.: US 11,416,562 B1
(45) Date of Patent: Aug. 16, 2022

(54) CORPUS EXPANSION USING LEXICAL SIGNATURES

(71) Applicant: International Business Machines Corporation, Armonk, NY (US)

(72) Inventors: Daniel Gruhl, San Jose, CA (US); Anna Lisa Gentile, San Jose, CA (US); Petar Ristoski, San Jose, CA (US); Linda Ha Kato, San Jose, CA (US); Chad Eric DeLuca, Morgan Hill, CA (US); Steven R. Welch, Gilroy, CA (US); Alfredo Alba, Morgan Hill, CA (US); Ismini Lourentzou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 17/238,288

(22) Filed: Apr. 23, 2021

(51) Int. Cl.
  *G06F 16/93* (2019.01)
  *G06F 40/284* (2020.01)
  *G06F 16/2457* (2019.01)

(52) U.S. Cl.
  CPC ........ *G06F 16/93* (2019.01); *G06F 16/24578* (2019.01); *G06F 40/284* (2020.01)

(58) Field of Classification Search
  CPC .......... G06N 20/00; G06N 3/08; G06F 16/31; G06F 40/237; G06F 40/279; G06F 40/284; G06F 16/254; G06F 16/24578
  See application file for complete search history.

(56) References Cited

U.S. PATENT DOCUMENTS

| | | |
|---|---|---|
| 6,542,889 B1 | 4/2003 | Aggarwal |
| 7,440,947 B2 | 10/2008 | Adcock |
| 8,533,148 B1 | 9/2013 | Feuersänger |
| 8,832,015 B2 | 9/2014 | Cox |
| 9,081,852 B2 | 7/2015 | Marvit |
| 9,740,685 B2 | 8/2017 | Beaurpere |
| 9,792,355 B2 | 10/2017 | Heidasch |
| 10,002,183 B2 | 6/2018 | Assadollahi |
| 10,467,214 B1 | 11/2019 | Sloan |

OTHER PUBLICATIONS

Dorji et al., "Extraction, selection and ranking of Field Association (FA) Terms from domain-specific corpora for building a comprehensive FA terms dictionary", Knowledge and Information Systems, vol. 27, pp. 141-161, Apr. 24, 2010, 21 Pages.

(Continued)

*Primary Examiner* — Hau H Hoang
(74) *Attorney, Agent, or Firm* — Stephanie L. Carusillo (57) ABSTRACT

In an approach to corpus expansion using lexical signatures, one or more computer processors retrieve a donor corpus of text, wherein the donor corpus includes a plurality of documents. One or more computer processors generate a document signature for each of the plurality of documents in the donor corpus. One or more computer processors retrieve a target corpus of text for expansion. One or more computer processors generate a corpus signature for the target corpus. One or more computer processors compare each document signature to the corpus signature. Based on the comparison, one or more computer processors determine a similarity score for each document signature. One or more computer processors rank the plurality of documents by the similarity score. One or more computer processors add one or more top-ranked documents of the plurality of documents to the target corpus.

20 Claims, 4 Drawing Sheets

(56) References Cited

OTHER PUBLICATIONS

Duan et al., "Studying on Extraction Method for Semantic Relationship among Topic Words", 2015 5th International Conference on Information Science and Technology (ICIST), Changsha, Hunan, China, pp. 504-508, Apr. 24-26, 2015, 5 Pages.

Gruhl et al., "Common Crawl Corpus Expansion", Grace Period Disclosure, Feb. 26, 2021, 13 Pages.

Lopes et al., "Evaluation of cutoff policies for term extraction", Journal of the Brazilian Computer Society, 21, Article No. 9, Jul. 14, 2015, 13 Pages.

Lopes et al., "The Impact of Contrastive Corpora for Term Relevance Measures", Brazilian Conference on Intelligent Systems (BRACIS), Nov. 2015, 7 Pages.

Soleimani et al., "Parsimonious Topic Models with Salient Word Discovery", IEEE Transaction on Knowledge and Data Engineering, 27, Sep. 11, 2014, 14 Pages.

Yaxiong et al., "Text Clustering Based on Domain Ontology and Latent Semantic Analysis", 2010 International Conference on Asian Language Processing, pp. 219-222, Dec. 28-30, 2010, 4 Pages.

Zhao et al., "Learning Topics using Semantic Locality", International Conference of Pattern Recognition (ICPR), Apr. 11, 2018, 6 Pages.

CORPUS EXPANSION USING LEXICAL SIGNATURES

STATEMENT ON PRIOR DISCLOSURES BY AN INVENTOR

The following disclosure is submitted under 35 U.S.C. 102(b)(1)(A) as prior disclosure by, or on behalf of, a sole inventor of the present application or a joint inventor of the present application:

"Common Crawl Corpus Expansion", by Daniel Gruhl et al, IBM Corporation, made publicly available Feb. 26, 2021.

BACKGROUND OF THE INVENTION

The present invention relates generally to the field of machine learning, and more particularly to corpus expansion using lexical signatures.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from, and make predictions based on, data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data.

The World Wide Web is a dynamic information resource: web pages and hyperlinks are constantly being added, modified, moved, and deleted by independent entities around the world. A significant percentage of requested hyperlinks are broken, i.e., return an error. Because of the web's scale, dynamics, distributed control, and lack of facilities for maintaining persistence of information, finding desired information may be a challenging problem. An approach to solving the problem of broken links is to compute a lexical signature for each document. A lexical signature is a small set of terms derived from the content of a document capturing an "aboutness" of the document. The lexical signature can then be used as a search engine query to discover the document. This can be useful if, for example, the content of a web page has been moved from its original Uniform Resource Locator (URL). Typically, the lexical signature of the document consists of the top n terms with the highest term frequency.

SUMMARY

Embodiments of the present invention disclose a computer-implemented method, a computer program product, and a system for corpus expansion using lexical signatures. The computer-implemented method may include one or more computer processors retrieving a donor corpus of text, wherein the donor corpus includes a plurality of documents. One or more computer processors generate a document signature for each of the plurality of documents in the donor corpus. One or more computer processors retrieve a target corpus of text for expansion. One or more computer processors generate a corpus signature for the target corpus. One or more computer processors compare each document signature to the corpus signature. Based on the comparison, one or more computer processors determine a similarity score for each document signature. One or more computer processors rank the plurality of documents by the similarity score. One or more computer processors add one or more top-ranked documents of the plurality of documents to the target corpus.

DETAILED DESCRIPTION

From fine-tuning pre-trained embedding models to automatically extracting quality knowledge and exploiting the models in further higher-level applications (e.g., question answering, reasoning, etc.), quality domain-specific text attuned to a specific use-case is essential. Those skilled in the art will understand that knowledge induction from a corpus of text may be difficult if the corpus is too small and/or if the corpus is not rich in the concepts to be focused on. For example, a system may be configured with a corpus based on public troubleshooting documents. However, such a system may utilize a relatively small corpus size (e.g., approximately 4,000 documents occupying 6 MB). Such a corpus size may be relatively small compared to other systems that utilize a much larger corpus size (e.g., another system may use approximately 55,000 documents occupying 75 MB, while yet another system may use approximately 212,000 documents occupying 768 MB). Also, the corpus being used by the system may not use fully natural language, such as being formatted in lists, commands, logs, tables, presentation slides, chat conversations, etc.

There are large, public datasets from which data can be extracted for corpus expansion, but public datasets tend not to be focused on a specific topic, and therefore, may introduce a fair amount of noise. There exists a plurality of techniques to expand a corpus, many of which depend on natural language processing of documents in public datasets.

Embodiments of the present invention recognize that applying the concept of a "lexical signature" in a way that characterizes a document within a corpus, or a corpus itself, provides a method for expanding a corpus that is not used in historical corpus expansion processes. Embodiments of the present invention recognize that efficiency may be gained by generating a large, on-topic dataset from a large, public source to create a focused corpus to be used for training data in an unsupervised machine learning approach. Embodiments of the present invention recognize that creating a uniform record, i.e., a fixed length signature, for each document in the large, public source can speed up the process of corpus expansion by orders of magnitude. Embodiments of the present invention also recognize that additional efficiency may be gained by expanding a corpus without the need for natural language processing to interpret the content of documents within the large, public database to make complex relationships between terms, but by instead using term frequency. Implementation of embodiments of the invention may take a variety of forms, and exemplary implementation details are discussed subsequently with reference to the Figures.

Figure 1:
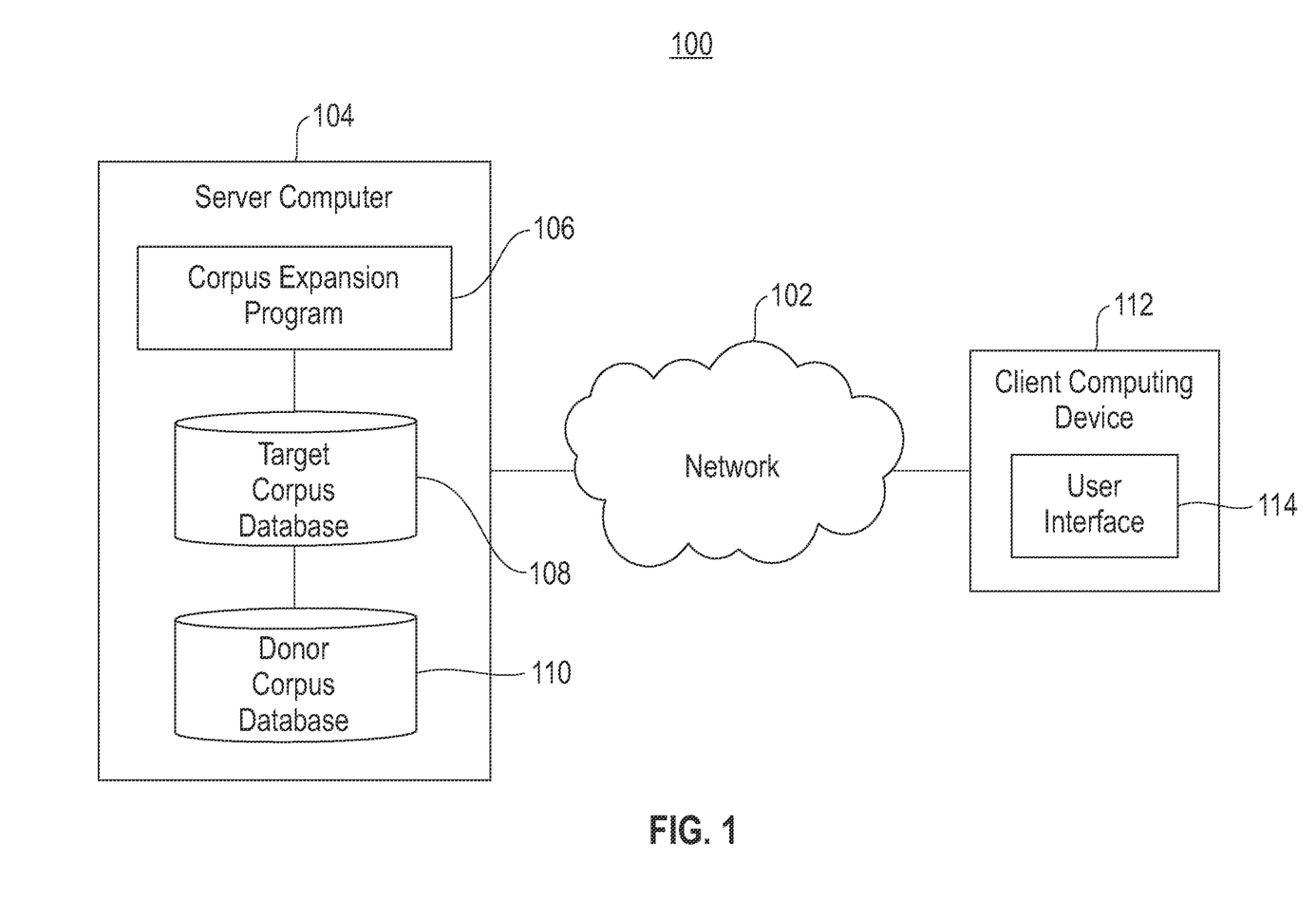
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes corpus expansion program 106, target corpus database 108, and donor corpus database 110. Server computer 104 may include internal and external hardware components, as depicted and described in further detail with respect to FIG. 4.

Corpus expansion program 106 expands a user corpus of text by finding similar web pages in a large, public database. Corpus expansion program 106 retrieves a donor corpus. Corpus expansion program 106 generates a lexical signature, hereinafter "signature," for each document in the donor corpus, as will be described in further detail with respect to FIG. 2 and FIG. 3. Corpus expansion program 106 retrieves a target corpus for expansion. Corpus expansion program 106 generates a signature for the target corpus. Corpus expansion program 106 compares each document signature of the donor corpus to the target corpus signature and determines whether the similarity of each document signature to the target corpus signature exceeds a pre-defined threshold. If corpus expansion program 106 determines the similarity exceeds the threshold, then corpus expansion program 106 ranks the similarities. Corpus expansion program 106 adds the top-ranked documents to the target corpus.

Corpus expansion program 106 generates a lexical signature of a corpus by first determining a document frequency for each term in the corpus. Corpus expansion program 106 clips the terms by a minimum document frequency. Corpus expansion program 106 ranks the remaining terms. Corpus expansion program 106 selects a pre-defined quantity of the least frequent terms in that document. Corpus expansion program 106 stores the signature. Corpus expansion program 106 is depicted and described in further detail with respect to FIG. 2 and FIG. 3.

In the depicted embodiment, target corpus database 108 and donor corpus database 110 each reside on server computer 104. In another embodiment, target corpus database 108 and donor corpus database 110 may each reside elsewhere within distributed data processing environment 100, provided that corpus expansion program 106 has access to target corpus database 108 and donor corpus database 110. A database is an organized collection of data. Target corpus database 108 and donor corpus database 110 can each be implemented with any type of storage device capable of storing data and configuration files that can be accessed and utilized by corpus expansion program 106, such as a database server, a hard disk drive, or a flash memory. Target corpus database 108 stores information used and generated by corpus expansion program 106. Target corpus database 108 stores one or more corpora provided by a user of client computing device 112. Target corpus database 108 also stores data retrieved from donor corpus database 110 that corpus expansion program 106 combines with the one or more user-provided corpora. Further, target corpus database 108 stores one or more lexical signatures generated by corpus expansion program 106. In addition, target corpus database 108 stores one or more pre-defined thresholds for generating the lexical signatures and for comparison of the lexical signatures. Donor corpus database 110 is a public database that stores a large number of documents that span many, diverse facets of knowledge.

The present invention may contain various accessible data sources, such as target corpus database 108 and donor corpus database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Corpus expansion program 106 enables the authorized and secure processing of personal data. Corpus expansion program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Corpus expansion program 106 provides information regarding personal data and the nature (e.g., type, scope, purpose, duration, etc.) of the processing. Corpus expansion program 106 provides the user with copies of stored personal data. Corpus expansion program 106 allows the correction or completion of incorrect or incomplete personal data. Corpus expansion program 106 allows the immediate deletion of personal data.

Client computing device 112 can be one or more of a laptop computer, a tablet computer, a smart phone, smart watch, a smart speaker, or any other programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of user interface 114.

User interface 114 provides an interface between corpus expansion program 106 on server computer 104 and a user of client computing device 112. In one embodiment, user interface 114 is mobile application software. Mobile application software, or an "app," is a computer program designed to run on smart phones, tablet computers and other mobile devices. In one embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 114 enables a user of client computing device 112 to provide a corpus of text to be expanded by corpus expansion program 106. User interface 114 also enables a user of client computing device 112 to provide preferences, thresholds, and/or criteria for use by corpus expansion program 106.

Figure 2:
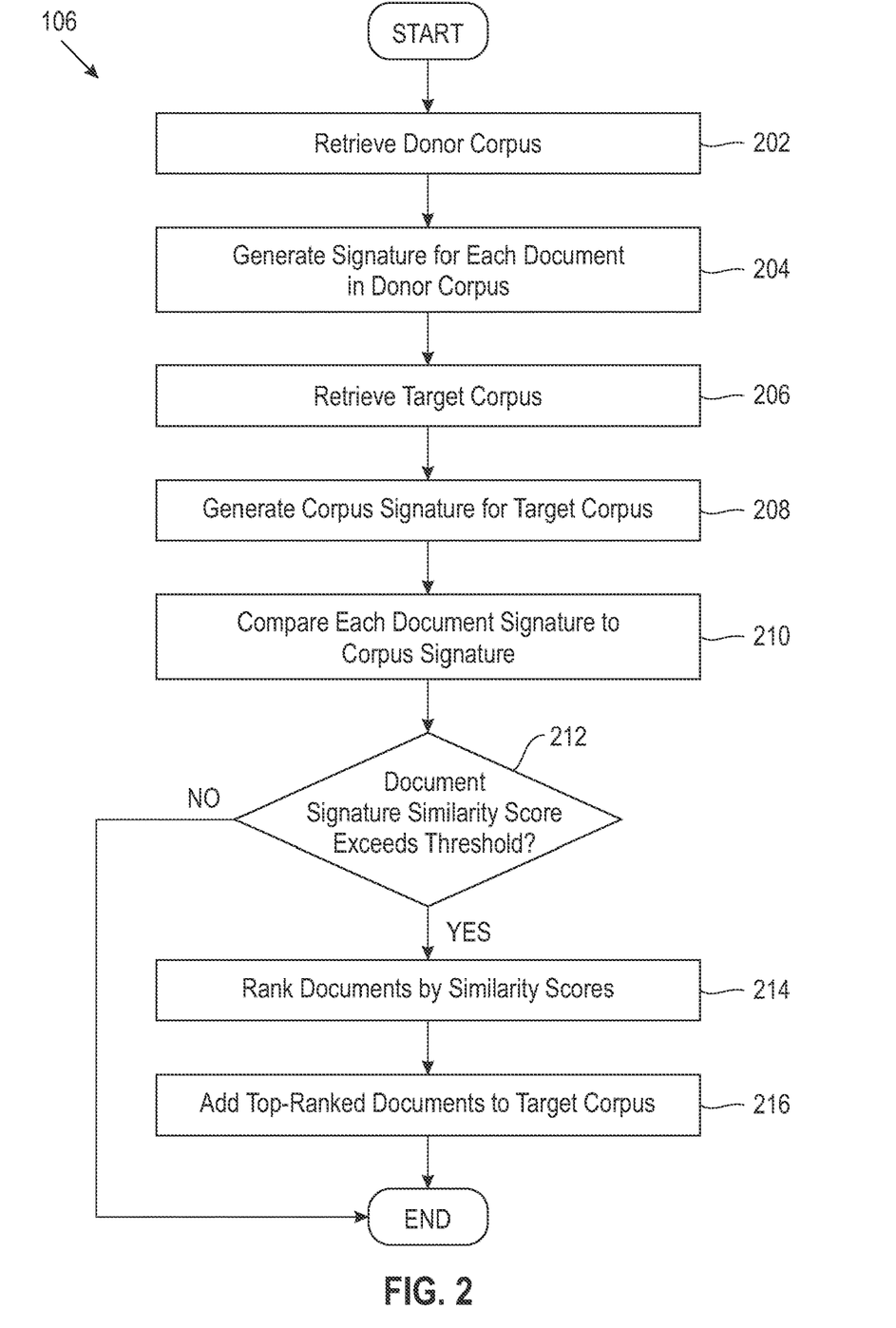
FIG. 2 is a flowchart depicting operational steps of a corpus expansion program, on a server computer within the distributed data processing environment of FIG. 1, for corpus expansion using lexical signatures, in accordance with an embodiment of the present invention.

FIG. 2 is a flowchart depicting operational steps of corpus expansion program 106, on server computer 104 within distributed data processing environment 100 of FIG. 1, for corpus expansion using lexical signatures, in accordance with an embodiment of the present invention.

Corpus expansion program 106 retrieves a donor corpus (step 202). In an embodiment, in preparation for expanding a target corpus, corpus expansion program 106 retrieves a donor corpus from donor corpus database 110. In general, the retrieved donor corpus of text is an existing, public dataset that includes a large number of documents that span diverse facets of knowledge and information. The large number of documents, for example, over ten million documents, included in the donor corpus may be of a plurality of topics and subjects.

Corpus expansion program 106 generates a signature for each document in the donor corpus (step 204). In an embodiment, corpus expansion program 106 generates a lexical signature for each document included in the donor corpus. A signature of a document, as used herein, consists of a list of a pre-defined number of terms with the lowest frequency of occurrence in the document. Signature generation will be discussed in further detail with respect to FIG. 3.

Corpus expansion program 106 retrieves a target corpus (step 206). In an embodiment, corpus expansion program 106 retrieves the corpus to be expanded, i.e., the target corpus, from target corpus database 108. In an embodiment, the target corpus is used for training a machine learning model on a particular subject. For example, the target corpus may be on the topic of pizza.

Corpus expansion program 106 generates a corpus signature for the target corpus (step 208). In an embodiment, corpus expansion program 106 generates a lexical signature to represent the target corpus. A signature of the target corpus is a list of a pre-defined number of terms with the lowest frequency of occurrence in the target corpus. Signature generation will be discussed in further detail with respect to FIG. 3.

Corpus expansion program 106 compares each document signature to the corpus signature (step 210). In an embodiment, corpus expansion program 106 compares each document signature to the signature of the target corpus to determine a measure of similarity between the two signatures, i.e., a similarity score. For example, corpus expansion program 106 looks for one or more terms in a document signature that match one or more terms in the corpus signature. The similarity score may be measured, for example, by a quantity of terms in the document signature that match the corpus signature, e.g., five terms in the document signature match the corpus signature. The similarity score may also be measured, for example, by a percentage of terms in the document signature that match the terms in the corpus signature, e.g., 25% of the terms in the document signature match the terms in the corpus signature.

Corpus expansion program 106 determines whether a document signature similarity score exceeds a threshold (decision block 212). In an embodiment, corpus expansion program 106 determines whether the similarity score of the document signature exceeds a pre-defined threshold of similarity. For example, the threshold may be a number of terms that overlap between the document signature and the target corpus signature. In the example, at least two terms, such as pepperoni and mozzarella, must be in both signatures. In another example, the threshold may be a percentage of terms that overlap between the document signature and the target corpus signature. In a further example, the threshold may be a minimum number, such as documents with at least five overlapping terms. In an embodiment, corpus expansion program 106 reviews each document signature of the donor corpus iteratively until corpus expansion program 106 determines the similarity for each one. In an embodiment, a user of client computing device 112, via user interface 114, stores the pre-defined threshold in target corpus database 108. In another embodiment, corpus expansion program 106 prompts the user of client computing device 112 for a pre-defined threshold, via user interface 114. In yet another embodiment, corpus expansion program 106 determines the threshold and stores the threshold in target corpus database 108. In a further embodiment, corpus expansion program 106 determines the threshold based on historical data stored in target corpus database 108. If corpus expansion program 106 determines a document signature similarity does not exceed a threshold ("no" branch, decision block 212), then corpus expansion program 106 ends execution.

If corpus expansion program 106 determines a document signature similarity score exceeds a threshold ("yes" branch, decision block 212), then corpus expansion program 106 ranks the documents by similarity scores (step 214). In an embodiment, responsive to determining which documents exceed the similarity threshold, corpus expansion program 106 ranks the documents of the donor corpus with document signatures that exceed the pre-defined threshold by the respective similarity scores. The ranking enables corpus expansion program 106 to determine which of the documents of the donor corpus are most similar to the target corpus. In an embodiment, corpus expansion program 106 uses a "merge-and" operation, as would be recognized by a person of skill in the art, to sort the list of document signatures and identify the terms that are in both signatures. In an embodiment where each document signature is represented in a 4-byte unsigned integer, corpus expansion program 106 performs the merge-and operation between sorted lists of 32-bit integers. By using small, uniform-sized signatures, one processor core can sort through ten million documents in one second. The speed with which corpus expansion program 106 can produce the ranked list of documents provides a much shorter wait time than other techniques known in the art, and therefore, a much better experience for the user of client computing device 112.

Corpus expansion program 106 adds top-ranked documents to the target corpus (step 216). In an embodiment, corpus expansion program 106 adds the top-ranked documents of the donor corpus to the target corpus stored in target corpus database 108, resulting in an expanded target corpus. In an embodiment, the top-ranked documents are documents that exceed a pre-defined ranking or quantity, i.e., a clip level. For example, the top-ranked documents may be defined as the top 1000 documents of the ranked list. In an embodiment, the user of client computing device 112 may define the clip level and store the clip level, via user interface 114, in target corpus database 108. In another embodiment, corpus expansion program 106 determines the clip level and stores the clip level in target corpus database 108. In a further embodiment, corpus expansion program 106 determines the clip level based on historical data stored in target corpus database 108.

In an embodiment, corpus expansion program 106 acts as a preprocessor for other processes that require a focused corpus with an enriched set of documents.

Figure 3:
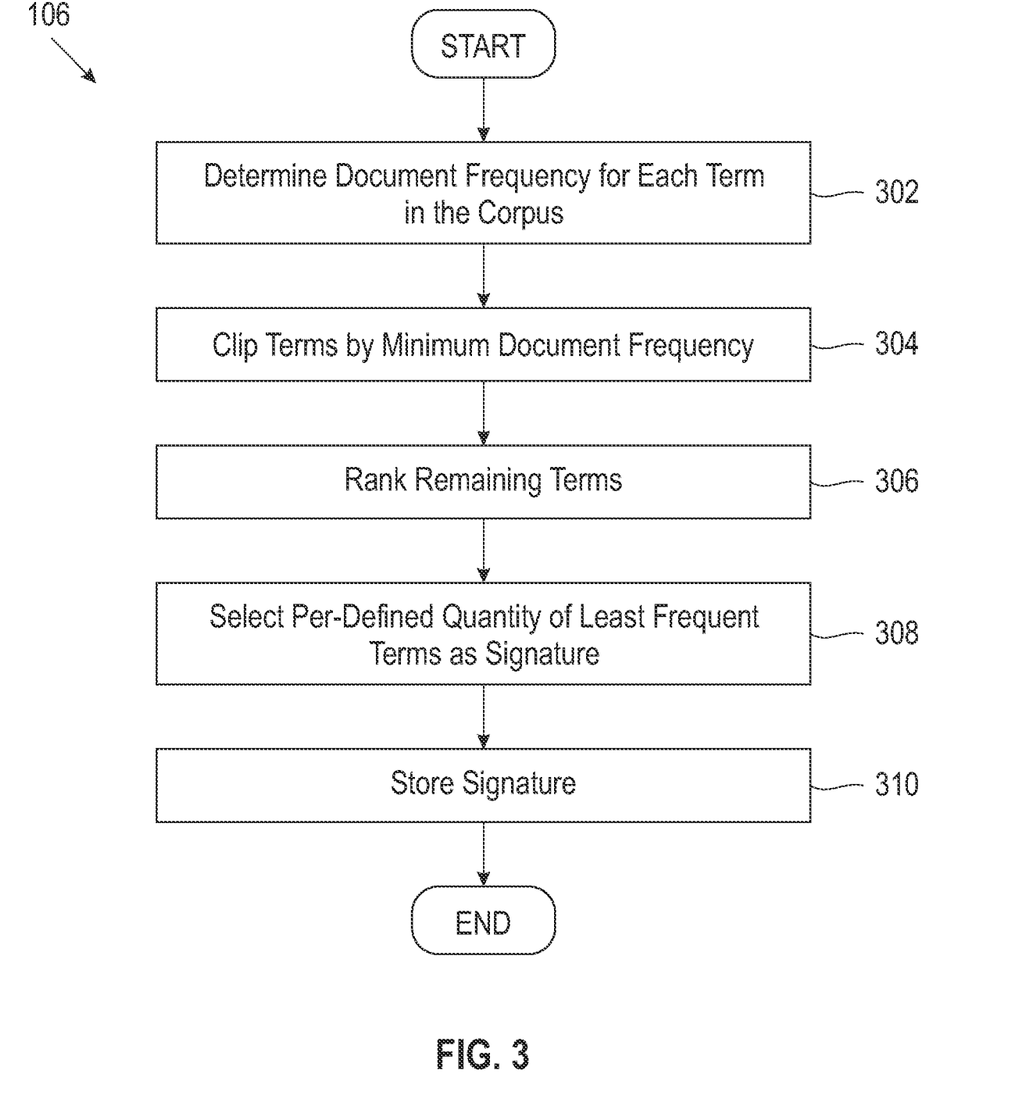
FIG. 3 is a flowchart depicting operational steps of the corpus expansion program, on the server computer within the distributed data processing environment of FIG. 1, for generating a lexical signature, in accordance with an embodiment of the present invention.

FIG. 3 is a flowchart depicting operational steps of corpus expansion program 106, on server computer 104 within distributed data processing environment 100 of FIG. 1, for generating a lexical signature of a corpus, in accordance with an embodiment of the present invention.

Corpus expansion program 106 determines the document frequency for each term in the corpus (step 302). In an embodiment, corpus expansion program 106 determines a document frequency associated with a given term, i.e., the number of documents in the corpus in which the given term appears. The document frequency yields a measure of whether a term is frequently found in the corpus or is more focused within the corpus. In the embodiment, corpus expansion program 106 generates a list of all the terms in the corpus with a count of the number of documents in which each term occurs.

Corpus expansion program 106 clips the terms by minimum document frequency (step 304). In an embodiment, corpus expansion program 106 clips the list of terms by a pre-defined minimum document frequency, i.e., removes the terms with a number of occurrences below a pre-defined clip level/threshold, in order to generate a collection of terms with high document frequencies. For example, corpus expansion program 106 may delete all terms that occur in less than 1000 documents. In an embodiment, the user of client computing device 112 may define the clip level and store the clip level, via user interface 114, in target corpus database 108. In another embodiment, corpus expansion program 106 determines the clip level and stores the clip level in target corpus database 108. In a further embodiment, corpus expansion program 106 determines the clip level based on historical data stored in target corpus database 108.

Corpus expansion program 106 ranks the remaining terms (step 306). In an embodiment, corpus expansion program 106 ranks the terms remaining in the list, i.e., numbering the terms in each document by document frequency from the most frequent to the least frequent. For example, the word "to" may occur ten million times, but the word "pepperoni" may occur only one thousand times, so "to" is ranked earlier in the list than "pepperoni."

Corpus expansion program 106 selects a pre-defined quantity of least frequent terms as a signature (step 308). In an embodiment, corpus expansion program 106 generates a truncated lexical signature for each document in the donor corpus by selecting documents with a pre-defined quantity of terms with the lowest document frequencies, i.e., the lowest ranking terms in the list of terms that appear in at least the minimum number of documents. The signature is "truncated" because the list is clipped by the pre-defined quantity for document frequency. For example, corpus expansion program 106 may choose the 50 or 100 least frequent terms. The least frequent terms are typically specialized terminology and better describe the subject, or a specific concept, of a document. For example, if the words "pepperoni," "takeout," and "shredded mozzarella" occur in a document infrequently, e.g., only twenty times, then corpus expansion program 106 can determine the subject of the document is pizza. In an embodiment where corpus expansion program 106 chooses the 50 least frequent terms, corpus expansion program 106 refers to the generated signature as the $Sig_{50}$. In an embodiment, corpus expansion program 106 represents each term in the signature with a 4-byte unsigned integer. Thus, in the example of choosing the 50 least frequent terms, the $Sig_{50}$ is a uniform, i.e., fixed length, record of 200 bytes per document. In an embodiment where the donor corpus consists of ten million documents, corpus expansion program 106 represents the entire donor corpus with a two-gigabit file.

In an embodiment, corpus expansion program 106 generates a truncated lexical signature for the target corpus by selecting a pre-defined quantity of terms from the target corpus with the lowest document frequencies in the donor corpus, i.e., the lowest ranking terms in the list of terms that appear in at least the minimum number of documents. For example, corpus expansion program 106 may select terms that appear in at least two documents of the target corpus, thereby reducing noise in the selected terms. For example, corpus expansion program 106 generates a list of 1000 terms that appear at least twice in the target corpus that are the least frequent in the clipped list of terms from the donor corpus. In the embodiment where corpus expansion program 106 chooses the 1000 terms, corpus expansion program 106 refers to the generated signature as the $Sig_{1000}$, i.e., a single, 1000 term signature vector.

Corpus expansion program 106 stores the signature (step 310). In an embodiment, after generating a signature for each document in the donor corpus and/or a signature for the target corpus, corpus expansion program 106 stores the generated signature(s) in target corpus database 108.

Figure 4:
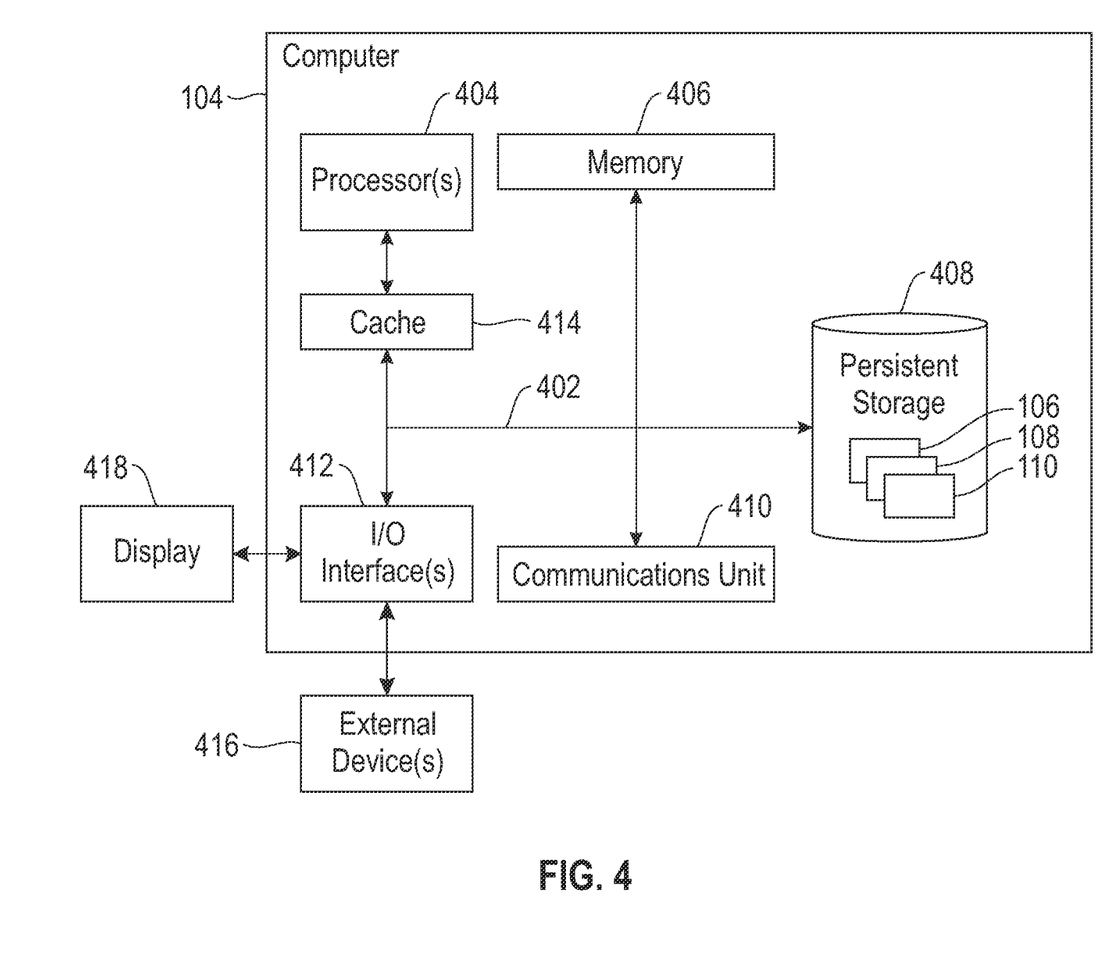
FIG. 4 depicts a block diagram of components of the server computer executing the corpus expansion program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., corpus expansion program 106, target corpus database 108, and donor corpus database 110, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 112. In these examples, communications unit 410 includes one or more network interface cards. Communications unit 410 may provide communications through the use of either or both physical and wireless communications links. Corpus expansion program 106, target corpus database 108, donor corpus database 110, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., corpus expansion program 106, target corpus database 108, and donor corpus database 110 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
retrieving, by one or more computer processors, a donor corpus of text, wherein the donor corpus includes a plurality of documents;
generating, by one or more computer processors, a document signature for each of the plurality of documents in the donor corpus;
retrieving, by one or more computer processors, a target corpus of text for expansion;
generating, by one or more computer processors, a corpus signature for the target corpus;
comparing, by one or more computer processors, each document signature to the corpus signature;
based on the comparison, determining, by one or more computer processors, a similarity score for each document signature;
ranking, by one or more computer processors, the plurality of documents by the similarity score; and
adding, by one or more computer processors, one or more top-ranked documents of the plurality of documents to the target corpus.

2. The computer-implemented method of claim 1, further comprising:
   determining, by one or more computer processors, whether the similarity score for each document signature exceeds a pre-defined threshold of similarity.

3. The computer-implemented method of claim 2, wherein the pre-defined threshold of similarity is selected from the group consisting of: a number of terms that overlap between the document signature and the corpus signature, a percentage of terms that overlap between the document signature and the corpus signature, and a minimum number of overlapping terms.

4. The computer-implemented method of claim 1, wherein generating the document signature for each of the plurality of documents in the donor corpus further comprises:
   determining, by one or more computer processors, a document frequency for each term of a plurality of terms in the donor corpus;
   clipping, by one or more computer processors, the plurality of terms by a minimum document frequency;
   ranking, by one or more computer processors, one or more remaining terms of the plurality of terms;
   selecting, by one or more computer processors, a pre-defined quantity of the one or more remaining terms with a lowest document frequency as the document signature; and
   storing, by one or more computer processors, the document signature.

5. The computer-implemented method of claim 1, wherein generating the corpus signature for the target corpus further comprises:
   determining, by one or more computer processors, a target document frequency for each term of a plurality of terms in the target corpus;
   clipping, by one or more computer processors, the plurality of terms by a minimum target document frequency;
   ranking, by one or more computer processors, one or more remaining terms of the plurality of terms;
   selecting, by one or more computer processors, a pre-defined quantity of the one or more remaining terms from the target corpus with a lowest document frequency in the donor corpus as the corpus signature; and
   storing, by one or more computer processors, the corpus signature.

6. The computer-implemented method of claim 1, wherein the document signature is a first list of a pre-defined number of first terms with a lowest frequency of occurrence in each of the plurality of documents in the donor corpus, and wherein the corpus signature is a second list of a pre-defined number of second terms with a lowest frequency of occurrence in the target corpus.

7. The computer-implemented method of claim 1, wherein the donor corpus of text is a public dataset that includes a large number of documents that span diverse facets of knowledge.

8. A computer program product comprising:
   one or more computer readable storage media and program instructions collectively stored on the one or more computer readable storage media, the stored program instructions comprising:
   program instructions to retrieve a donor corpus of text, wherein the donor corpus includes a plurality of documents;
   program instructions to generate a document signature for each of the plurality of documents in the donor corpus;
   program instructions to retrieve a target corpus of text for expansion;
   program instructions to generate a corpus signature for the target corpus;
   program instructions to compare each document signature to the corpus signature;
   based on the comparison, program instructions to determine a similarity score for each document signature;
   program instructions to rank the plurality of documents by the similarity score; and
   program instructions to add one or more top-ranked documents of the plurality of documents to the target corpus.

9. The computer program product of claim 8, the stored program instructions further comprising:
   program instructions to determine whether the similarity score for each document signature exceeds a pre-defined threshold of similarity.

10. The computer program product of claim 9, wherein the pre-defined threshold of similarity is selected from the group consisting of: a number of terms that overlap between the document signature and the corpus signature, a percentage of terms that overlap between the document signature and the corpus signature, and a minimum number of overlapping terms.

11. The computer program product of claim 8, wherein the program instructions to generate the document signature for each of the plurality of documents in the donor corpus comprise:
   program instructions to determine a document frequency for each term of a plurality of terms in the donor corpus;
   program instructions to clip the plurality of terms by a minimum document frequency;
   program instructions to rank one or more remaining terms of the plurality of terms;
   program instructions to select a pre-defined quantity of the one or more remaining terms with a lowest document frequency as the document signature; and
   program instructions to store the document signature.

12. The computer program product of claim 8, wherein the program instructions to generate the corpus signature for the target corpus comprise:
   program instructions to determine a target document frequency for each term of a plurality of terms in the target corpus;
   program instructions to clip the plurality of terms by a minimum target document frequency;
   program instructions to rank one or more remaining terms of the plurality of terms;
   program instructions to select a pre-defined quantity of the one or more remaining terms from the target corpus with a lowest document frequency in the donor corpus as the corpus signature; and
   program instructions to store the corpus signature.

13. The computer program product of claim 8, wherein the document signature is a first list of a pre-defined number of first terms with a lowest frequency of occurrence in each of the plurality of documents in the donor corpus, and wherein the corpus signature is a second list of a pre-defined number of second terms with a lowest frequency of occurrence in the target corpus.

14. The computer program product of claim 8, wherein the donor corpus of text is a public dataset that includes a large number of documents that span diverse facets of knowledge.

15. A computer system comprising:
one or more computer processors;
one or more computer readable storage media;
program instructions collectively stored on the one or more computer readable storage media for execution by at least one of the one or more computer processors, the stored program instructions comprising:
program instructions to retrieve a donor corpus of text, wherein the donor corpus includes a plurality of documents;
program instructions to generate a document signature for each of the plurality of documents in the donor corpus;
program instructions to retrieve a target corpus of text for expansion;
program instructions to generate a corpus signature for the target corpus;
program instructions to compare each document signature to the corpus signature;
based on the comparison, program instructions to determine a similarity score for each document signature;
program instructions to rank the plurality of documents by the similarity score; and
program instructions to add one or more top-ranked documents of the plurality of documents to the target corpus.

16. The computer system of claim 15, the stored program instructions further comprising:
program instructions to determine whether the similarity score for each document signature exceeds a pre-defined threshold of similarity.

17. The computer system of claim 16, wherein the pre-defined threshold of similarity is selected from the group consisting of: a number of terms that overlap between the document signature and the corpus signature, a percentage of terms that overlap between the document signature and the corpus signature, and a minimum number of overlapping terms.

18. The computer system of claim 15, wherein the program instructions to generate the document signature for each of the plurality of documents in the donor corpus comprise:
program instructions to determine a document frequency for each term of a plurality of terms in the donor corpus;
program instructions to clip the plurality of terms by a minimum document frequency;
program instructions to rank one or more remaining terms of the plurality of terms;
program instructions to select a pre-defined quantity of the one or more remaining terms with a lowest document frequency as the document signature; and
program instructions to store the document signature.

19. The computer system of claim 15, wherein the program instructions to generate the corpus signature for the target corpus comprise:
program instructions to determine a target document frequency for each term of a plurality of terms in the target corpus;
program instructions to clip the plurality of terms by a minimum target document frequency;
program instructions to rank one or more remaining terms of the plurality of terms;
program instructions to select a pre-defined quantity of the one or more remaining terms from the target corpus with a lowest document frequency in the donor corpus as the corpus signature; and
program instructions to store the corpus signature.

20. The computer system of claim 15, wherein the document signature is a first list of a pre-defined number of first terms with a lowest frequency of occurrence in each of the plurality of documents in the donor corpus, and wherein the corpus signature is a second list of a pre-defined number of second terms with a lowest frequency of occurrence in the target corpus.

* * * * *